(12) United States Patent
Lin

(10) Patent No.: US 11,243,360 B2
(45) Date of Patent: Feb. 8, 2022

(54) GUIDE PIN RETAINER AND OPTICAL CONNECTOR USING THE SAME

(71) Applicant: Yu-Ching Lin, Myau-Li County (TW)

(72) Inventor: Yu-Ching Lin, Myau-Li County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 0 days.

(21) Appl. No.: 16/999,090

(22) Filed: Aug. 21, 2020

(65) Prior Publication Data

US 2021/0124134 A1 Apr. 29, 2021

Related U.S. Application Data

(60) Provisional application No. 62/926,447, filed on Oct. 26, 2019.

(51) Int. Cl.
*G02B 6/38* (2006.01)

(52) U.S. Cl.
CPC ......... *G02B 6/3882* (2013.01); *G02B 6/3851* (2013.01); *G02B 6/3885* (2013.01)

(58) Field of Classification Search
None
See application file for complete search history.

(56) References Cited

U.S. PATENT DOCUMENTS

| | | | | |
|---|---|---|---|---|
| 9,411,101 | B2* | 8/2016 | Takahashi | G02B 6/3898 |
| 2002/0110333 | A1* | 8/2002 | Yang | G02B 6/3863 |
| | | | | 385/78 |
| 2004/0152354 | A1* | 8/2004 | Luther | G02B 6/3865 |
| | | | | 439/378 |
| 2016/0320574 | A1* | 11/2016 | Lin | G02B 6/3885 |
| 2016/0349464 | A1* | 12/2016 | Chang | G02B 6/3826 |
| 2017/0010422 | A1* | 1/2017 | Childers | G02B 6/3882 |
| 2017/0102505 | A1* | 4/2017 | Nguyen | G02B 6/3898 |
| 2017/0176694 | A1* | 6/2017 | Childers | G02B 6/3882 |
| 2017/0315308 | A1* | 11/2017 | Kamada | G02B 6/3898 |

FOREIGN PATENT DOCUMENTS

EP 0800100 A1 * 10/1997
WO WO 2016/053851 A1 * 4/2016

* cited by examiner

*Primary Examiner* — Michael Stahl

(57) ABSTRACT

The present invention provides a pin retainer comprising a base, and a retaining structure coupled to the base. The base has a through slot, two through-holes respectively formed at two opposite sides of an opening of the through-slot formed on a surface of the base for respectively accommodating guide pins, and first engaging structures respectively formed on two lateral surfaces of the base. The retaining structure has a pair of lateral plates slidably coupled to the two lateral surfaces. Each lateral plate has second engaging structure corresponding to the first engaging structure, and a positioning plate having a holding structure. The second engaging structure is combined with or released from the first engaging structure depending on the positions of the retaining structure. Alternatively, the present invention also presents an optical connector using the pin retainer.

16 Claims, 14 Drawing Sheets

GUIDE PIN RETAINER AND OPTICAL CONNECTOR USING THE SAME

CROSS-REFERENCE TO RELATED APPLICATION

This application claims the benefit under 35 U.S.C. § 119(e) to the U.S. provisional patent application having the Ser. No. 62/926,447 filed on Oct. 26, 2019, the entirety of which is incorporated herein by reference.

FIELD OF INVENTION

The present invention relates to an optical connector. In particular, it relates to a detachable and combinable optical connector having a guide pin retainer and the optical connector using the same.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In the field of optical fiber communication, optical connectors are very important components. In conventional technologies, for example, optical connectors using multi-fiber push on (MPO) technology can be employed to accommodate and connect the fiber. Generally, a plurality of MPO connectors are coupled together to connect an optical fiber cable as an optical transmission path. Therefore, the MPO optical connector has a male optical connector and a female optical connector. For example, please refer to FIGS. 1A and 1B, an elongated protrusion 112 is formed on the upper surface 110 of the optical connectors 100a and 100b, and a recess 114 is formed on both sides of the front section. A plurality of optical fibers 130 are exposed on the front end of the optical connectors 100a and 100b, and the end of each optical fiber 130 has the same plane as the surface 120 of the optical connectors 100a and 100b. In addition, two guide holes 150 are formed on the surface 120 of the optical connector 100b, a pair of guide pins 140 protrude from the surface 120 of the optical connector 100a, and the pair of guide pins 140 can be inserted into the guide holes 150 respectively.

In conventional technology, in certain usage situation, the guide pin needs to be disassembled and replaced, but because the guide pin is arranged inside the optical connector, how to efficiently replace it is a very important issue. If the optical connector can be easily replaced without completely disassemble the optical connector, it would increase the convenience of using the optical connector and save the time required for maintenance.

The above information disclosed in this section is only for enhancement of understanding of the background of the described technology and therefore it may contain information that does not form the prior art that is already known to a person of ordinary skill in the art.

SUMMARY OF THE INVENTION

The present invention provides a guide pin retainer of an optical connector. Through a mechanism in which a retaining structure slides in a first direction and a second direction on both lateral surfaces of a base, the effect of fixing and releasing the guide pin can be achieved respectively, and the convenience for users is increased to maintain the guide pins of the optical connector.

The present invention provides an optical connector having a housing, the single side of the housing can be opened and closed. In addition, an observation window is disposed and can be opened on the optical connector, the observation window allows users to observe the state of the communication wire, and the communication wire can be adjusted when installing the communication wire. Since the housing of the optical connector can be opened on one side, it's convenience for assembling the communication wire.

In one embodiment, the present invention provides a guide pin retainer, comprising: a base, having a through slot, a through hole disposed on a surface of an opening of the through slot and both sides of the opening for accommodating a guide pin, a first engaging structure formed on two lateral surfaces of the base; and a retaining structure, disposed on the base, the retaining structure having a pair of parallel lateral plates slidably coupled to the two lateral surfaces of the base respectively, the each lateral plate having a second engaging structure, a positioning plate extended from the each lateral plate and abutted against the surface, the positioning plate having a first holding structure, wherein when the retaining structure is located at a first position, the second engaging structure and the first engaging structure are combined with each other, the first holding structure is used for constraining the guide pin; and when the retaining structure is located at a second position, the second engaging structure is separated from the first engaging structure, the first holding structure is separated from the guide pin.

In another embodiment, the present invention also provides an optical connector, comprising: a first clamping assembly, for clamping a communication wire, the first clamping assembly having a first clamping seat for clamping the communication wire, the first clamping seat having a first guiding groove, which allows the communication wire to pass through, and the first clamping assembly having a housing module for covering the first clamping seat; a guide pin retainer, having a base and a retaining structure, the base having a through slot, the first clamping seat passing through the through slot, a through hole disposed on a surface of an opening of the through slot and both sides of the opening for accommodating a guide pin, a first engaging structure formed on two lateral surfaces of the base, and the retaining structure disposed on the base and having a pair of parallel lateral plates slidably coupled to the two lateral surfaces of the base respectively, the each lateral plate having a second engaging structure, a positioning plate extended from the each lateral plate and abutted against the surface, the positioning plate having a first holding structure, the retaining structure located at a first position, the second engaging structure and the first engaging structure combined with each other, the first holding structure used for constraining the guide pin; and a second clamping assembly, coupled to the first clamping assembly, the second clamping assembly having a second clamping seat, the second clamping seat having a second guiding groove corresponding to the first guiding groove, wherein when the housing module is disassembled to separate with the guide pin retainer and the retaining structure is located at a second position, the second engaging structure is separated from the first engaging structure, the first holding structure is separated from the guide pin.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1A:
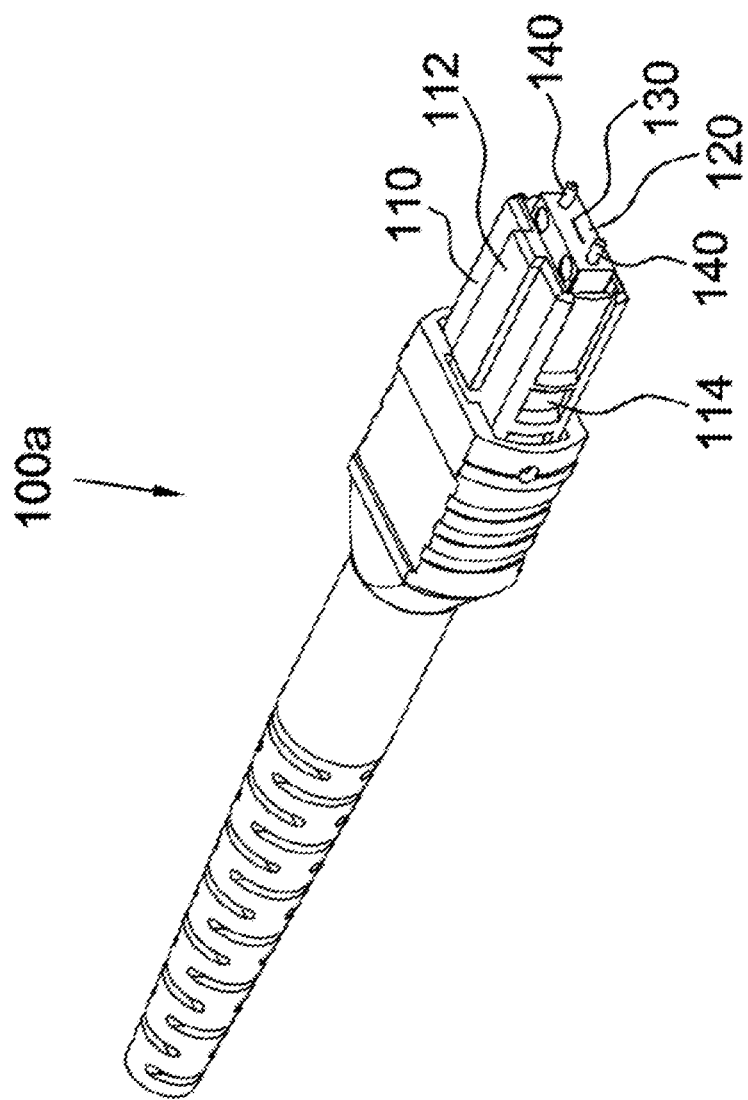
FIGS. 1A and 1B are schematic diagrams of conventional optical connectors.
Figure 1B:
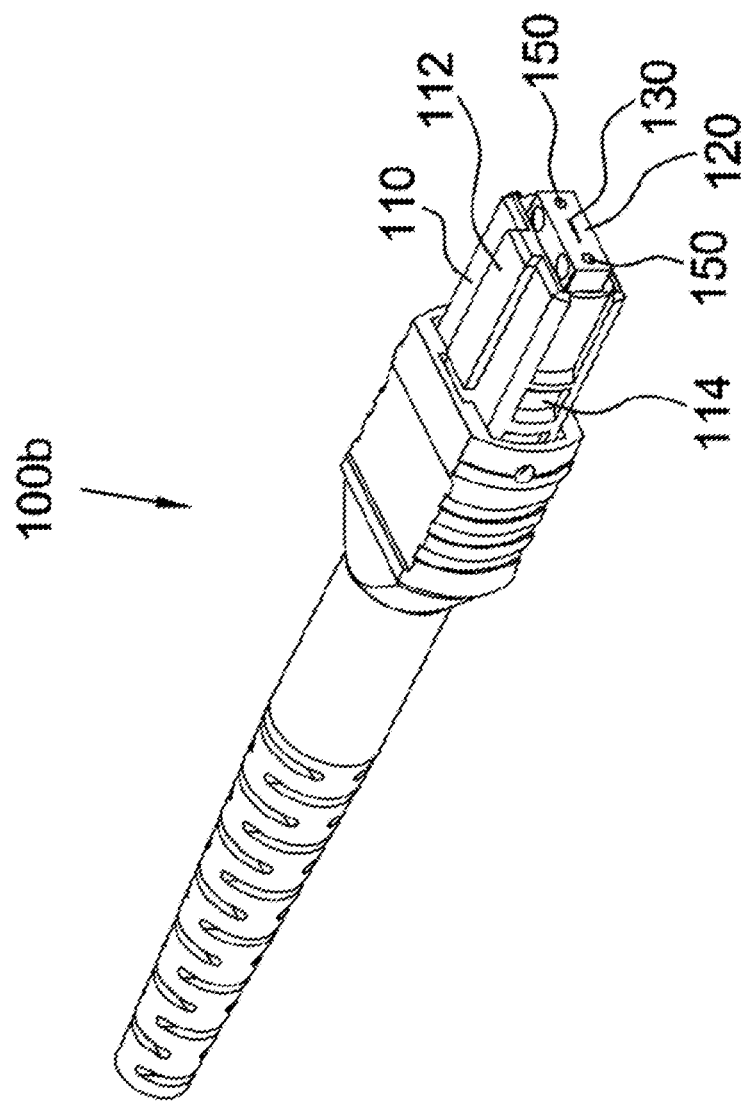

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate a guide pin retainer and optical connector using the same and to aid it of skilled in the art in practicing this invention. These embodiments are merely exemplary embodiments and in no way to be considered to limit the scope of the invention in any manner.

Figure 2A:
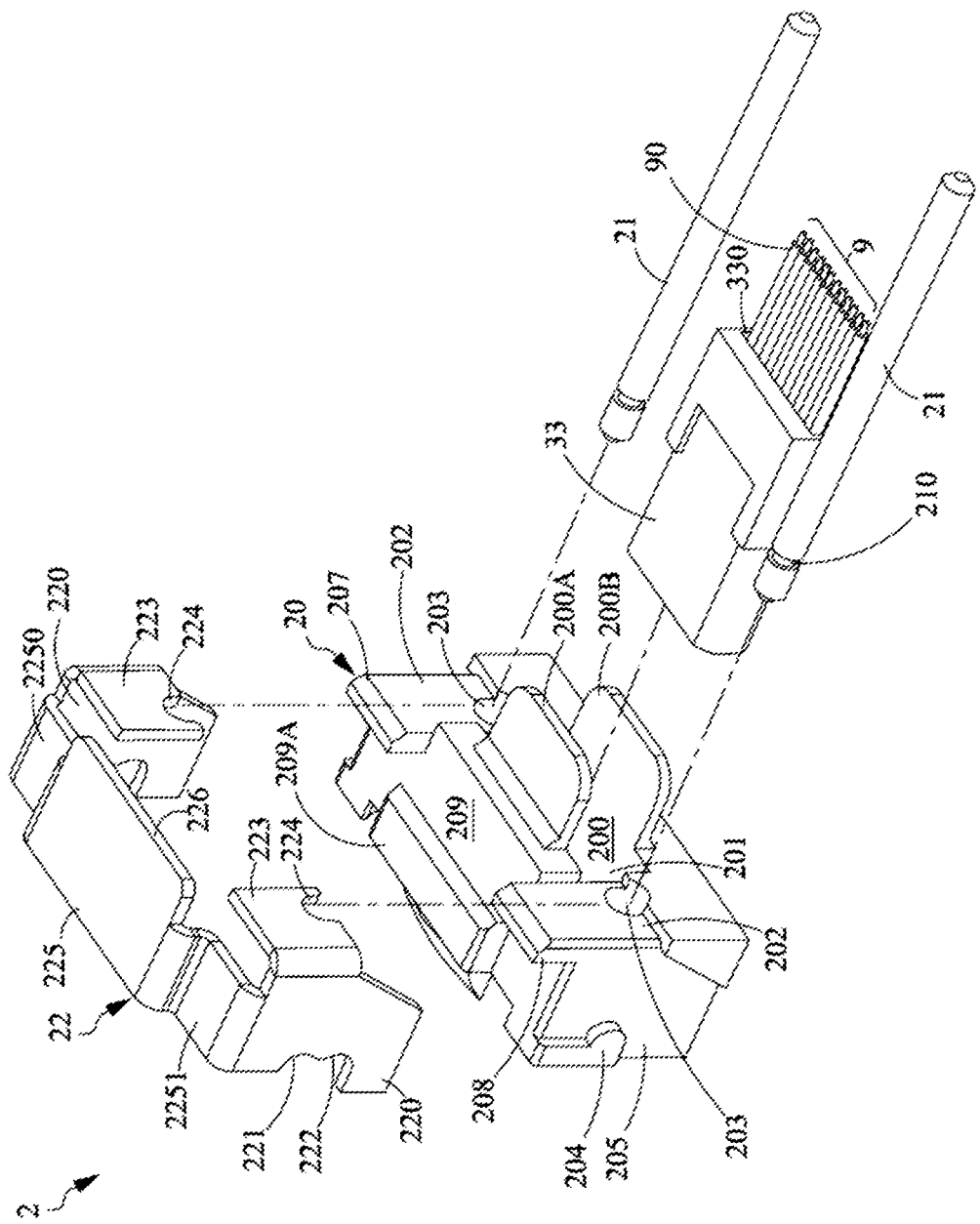
FIGS. 2A and 2B are respectively an exploded and three dimensional schematic diagrams of the first embodiment of the guide pin retainer in the present invention.
Figure 2B:
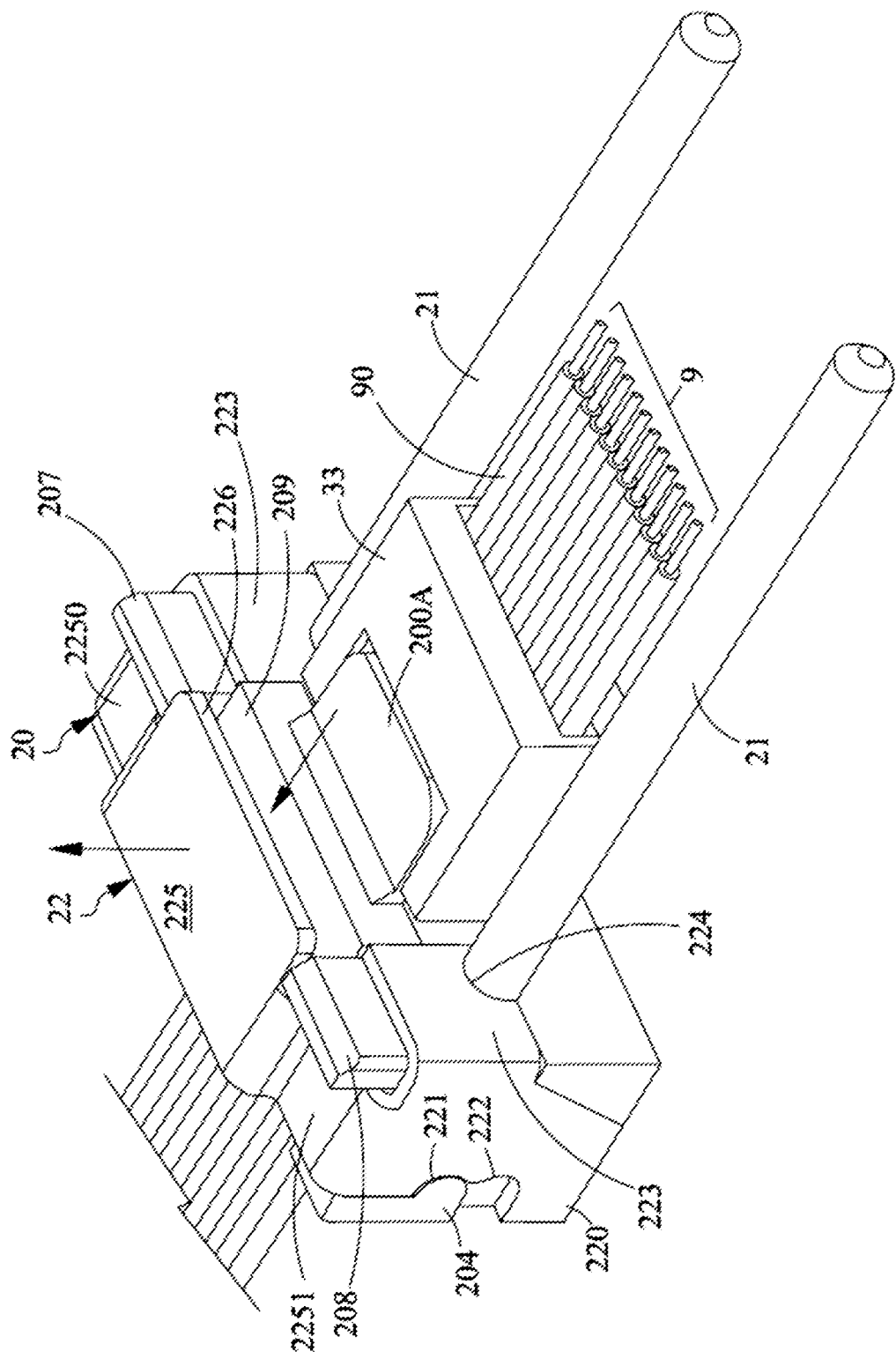

Please refer to FIGS. 2A and 2B, which are respectively an exploded and three dimensional schematic diagram of the first embodiment of the guide pin retainer in the present invention. The guide pin retainer 2 includes a base 20 and a retaining structure 22. The base 20 has a through slot 200, and a surface 202 on both sides of an opening 201 of the through slot 200 respectively has through holes 203 for accommodating the guide pin 21. The guide pin 21 has a second holding structure 210 on a side inserted into the through hole 203. In this embodiment, the second holding structure 210 is a ring-shaped groove design. A first engaging structure 204 is formed on two lateral surfaces 205 of the base 20 respectively. In this embodiment, the first engaging structure 204 is a convex structure. A pair of clamping plates 200A and 200B protrudes from the surface of the through slot 200. On the top surface 209, there are convex walls 207 and 208 and a convex body 209A. The convex walls 207 and 208 respectively correspond to through holes 203, and the two convex walls 207 and 208 are separated by a predetermined distance.

The retaining structure 22 is disposed on the base 20. The retaining structure 22 has a connecting plate 225 and a pair of lateral plates 220 parallel to each other. In this embodiment, the connecting plate 225 and the pair of lateral plates 220 form an inverted U-shaped structure and are slidably coupled to the base 20. Wherein, the two sides of the connecting plate 225 are bent into sub-connecting plates 2250 and 2251, which are connected to the pair of lateral plates 220 respectively. Each lateral plate 220 has a second engaging structure 221 and a third engaging structure 222. In this embodiment, the second engaging structure 221 and the third engaging structure 222 are concave structures that can be combined with the first engaging structure 204. Each lateral plate 220 is further bent to a positioning plate 223, and a first holding structure 224 is formed on the positioning plate 223. In this embodiment, the first holding structure 224 is a notch design for embedding into the second holding structure 210.

When the retaining structure 22 and the base 20 are combined together, the pair of lateral plates 220 is slidably coupled to the lateral surfaces 205 on both sides of the base 20 respectively. When the retaining structure 22 is located at the first position, the second engaging structure 221 is combined with the first engaging structure 204. In this state, the first holding structure 224 is abutted against the surface of the corresponding guide pin 21 to generate the effect of fixing the guide pin 21. In addition, when the retaining structure 22 is located at the first position, the sub-connecting plates 2250 and 2251 are abutted against the top surface 209. Since the sub-connecting plates 2250 and 2251 are formed by bending the two sides of the connecting plate 225, when the retaining structure 22 is located at the first position, there is a height difference between the connecting plate 225 and the top surface 209.

The connecting plate 225 protrudes from the extending plate 226, and the extending plate 226 is disposed between the two convex walls 207 and 208 when the retaining structure 22 is located at the first position. When the retaining structure 22 is arranged at the first position, the sub-connecting plate 2250 is abutted against the top surface 209 and is located on the top surface 209 between the convex wall 207 and the convex body 209A, and the sub-connecting plate 2251 is abutted against the convex wall 208 and is located on the top surface 209 between the convex wall 208 and the convex body 209A. A first clamping seat 33 is arranged between the pair of clamping plates 200A and 200B, and a communication wire 9 having a plurality of sub wires 90 is disposed inside of the first clamping seat 33. In this embodiment, the communication wire 9 is a light guide material, such as an optical fiber. An end of the first clamping seat 33 penetrates into the through slot 200 by the opening 201.

Figure 2C:
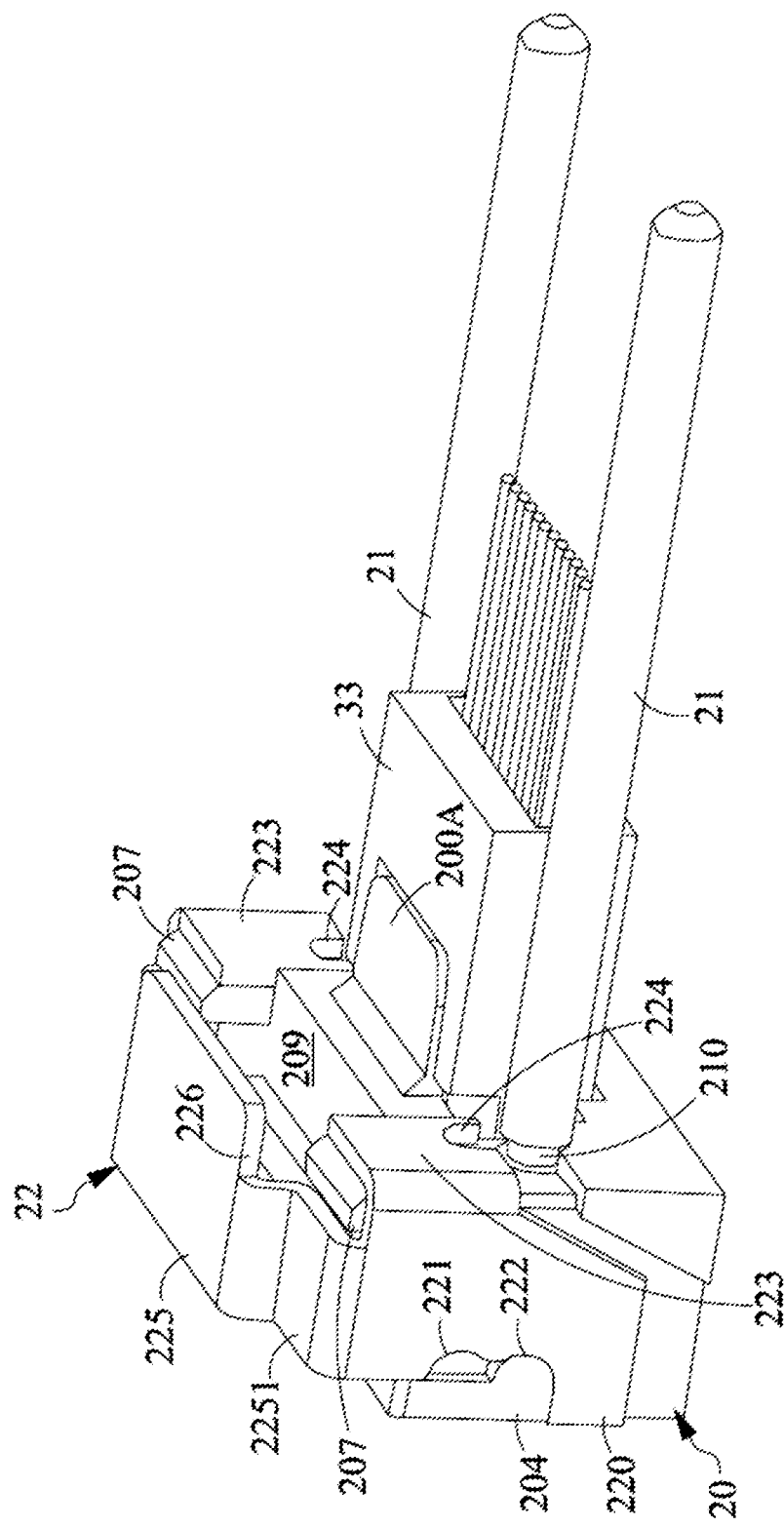
FIG. 2C is a schematic diagram of the retaining structure of the guide pin retainer moving to a second position in the present invention.

Please refer to FIGS. 2A to 2C. FIG. 2C is a schematic diagram of the retaining structure of the guide pin retainer moving to the second position in the present invention. As shown in FIG. 2B, when the retaining structure 22 is at the first position, the first holding structure 224 is embedded into the second holding structure 210 of the guide pin 21, and the first holding structure 224 and the second holding structure 210 are restrained each other. It makes the guide pin 21 positioned in the through hole 203 of the base 20. In addition, because the second engaging structure 221 is engaged with the first engaging structure 204, the retaining structure 22 can be firmly fixed on the base 20. When the user wants to replace the guide pin 21 or pull out the guide pin 21 for other purposes, the upward force can be applied to the extending plate 226 by a jig or finger in a space between the extending plate 226 and the top surface 209, the strength of which may make the second engaging structure 221 released from the restraint of the first engaging structure 204, so that the retaining structure 22 moves upwardly.

In this embodiment, because the retaining structure 22 further has a third engaging structure 222 located on one side of the second engaging structure 221, when the second engaging structure 221 is pushed away from the first engaging structure 204, the third engaging structure 222 is combined with the first engaging structure 204 to position the retaining structure 22 at the second position. Since the retaining structure 22 has moved upwardly for a certain distance, the first holding structure 224 also moves upwardly for a certain distance, so that the first holding structure 224 is no longer in contact with the second holding structure 210 on the surface of the guide pin 21. In this state, the user can take out the guide pin for replacement or maintenance. It should be noted that the third engaging structure 222 is not a necessary structure. The third engaging structure 222 can increase the fixing effect of the second position. Even without the third engaging structure 222, it does not affect the insertion and removal of the guide pin 21.

Figures 3A, 3B:
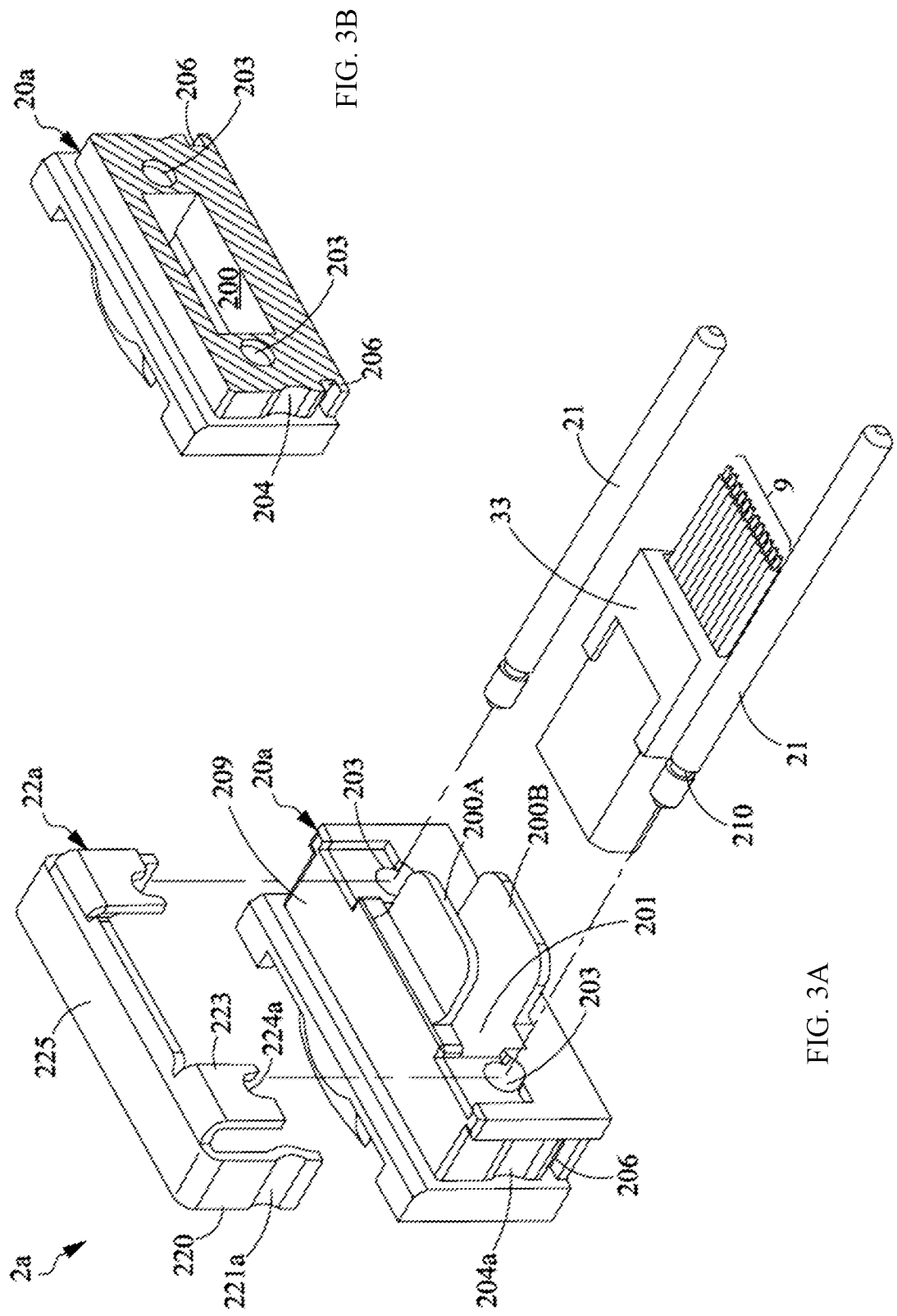
FIG. 3A is a three dimensional exploded diagram of another embodiment of the guide pin retainer in the present invention.
FIG. 3B is a schematic partial cross-sectional diagram of a base of FIG. 3A.

Please refer to FIGS. 3A and 3B. FIG. 3A is a three dimensional exploded schematic diagram of another embodiment of the guide pin retainer in the present invention, and FIG. 3B is a partial cross-sectional diagram of the base of FIG. 3A. In this embodiment, the guide pin retainer 2a includes a base 20a and a retaining structure 22a. The retaining structure 22a is slidably coupled to the base 20a. In this embodiment, the base 20a is located on both sides of the opening 201 and has through holes 203 respectively for accommodating the guide pin 21. A first holding structure 224a is disposed on the retaining structure 22a at a position corresponding to the through hole 203. When the retaining structure 22a is at the first position on the base 20a, the first holding structure 224a is abutted against the second holding structure 210 on the surface of guide pin 21, which is inserted into the through hole 203. There are first engaging structures 204a on both sides of the base 20a. In this embodiment, the first engaging structure 204a is a concave structure.

It should be noted that, in this embodiment, the retaining structure 22a has a connecting plate 225 with a pair of parallel lateral plates 220 extending parallel to each other at both ends. In this embodiment, the second engaging structure 221a corresponding to the first engaging structure 204a is formed on the end of the lateral plate 220. In this embodiment, the second engaging structure 221a is a convex structure that may be embedded into the first engaging structure 204a. The second engaging structure 221a may be combined with the first engaging structure 204a when the retaining structure 22a is located at the first position on the base 20a. In this embodiment, a recess 206 is disposed on a side of the base 20a corresponding to each first engaging structure 204a.

In this embodiment, the first engaging structure 204a is flexible, and the second engaging structure 221a is also flexible and can be deformed when subjected to a force, and released from the first engaging structure 204a. When the retaining structure 22a is at the first position, the second engaging structure 221a is combined with the first engaging structure 204a, and the first holding structure 224a is abutted against the second holding structure 210 on the surface of the corresponding guide pin 21, resulting in the effect of restraining and positioning the guide pin 21. When the first holding structure 224a is released from the surface of the guide pin 21, after moving the retaining structure 22a from the first position to the second position, the second engaging structure 221a is temporarily separated from the first engaging structure 204a, and the first holding structure 224a is separated from the second holding structure 210.

Figure 3C:
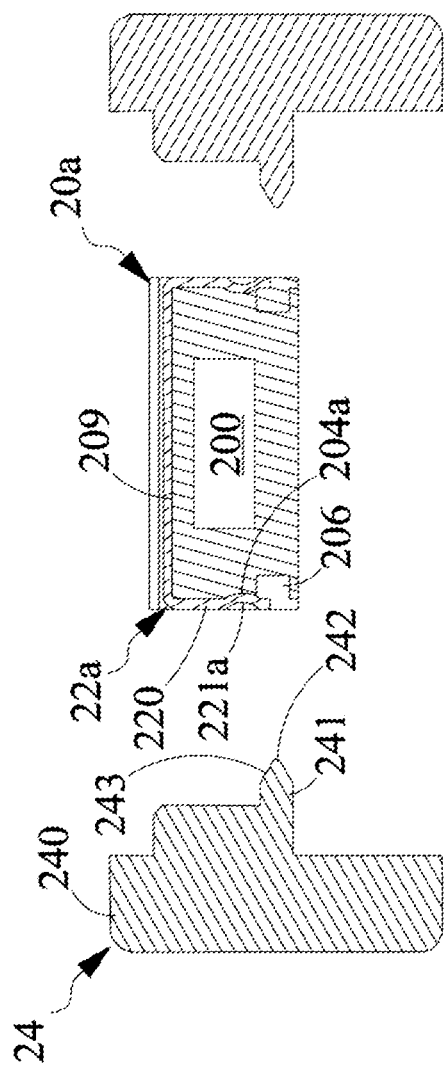
FIGS. 3C and 3D are respectively schematic cross-sectional diagrams of moving the retaining structure from the first position to the second position by a jig.
Figure 3D:
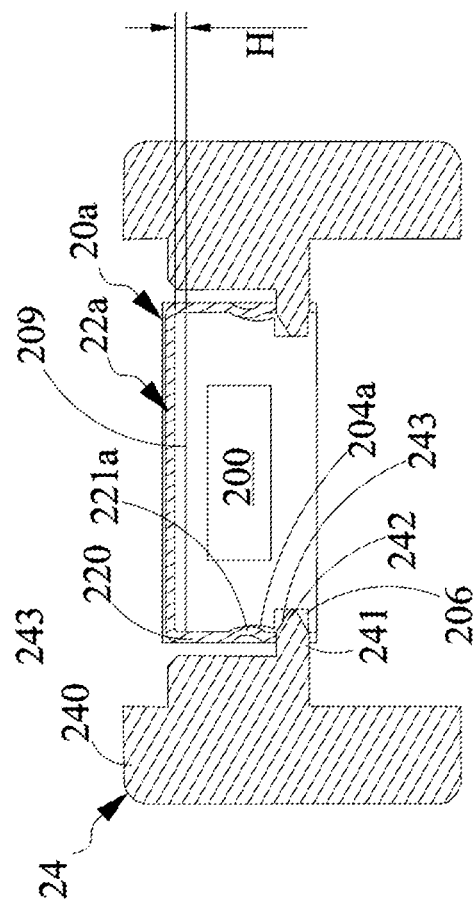

In this embodiment, the method of moving the retaining structure 22a from the first position to the second position is different from the previous embodiment. In this embodiment, as shown in FIGS. 3A to 3D, wherein FIGS. 3C and 3D are respectively schematic cross-sectional diagrams of moving the retaining structure from the first position to the second position. Since the recess 206 is disposed on a side of the first engaging structure 204a, it can be inserted by the jig 24 to move the retaining structure 22a from the first position to the second position. In FIG. 3C, the retaining structure 22a is located at the first position, and the first engaging structure 204a and the second engaging structure 221a are engaged with each other, so the retaining structure 22a can be stably fixed on the base 20a. In this state, the first holding structure 224a is abutted against the second holding structure 210 on the guide pin 21. When the guide pin 21 is disassembled, the position of the retaining structure 22a is controlled by the jigs 24 on both sides of the base 20a. In this embodiment, each jig 24 has a pressing plate 240 and a protruding structure 241. The protruding structure 241 of this embodiment has a tapered end structure 242 corresponding to the position of the recess 206 on both sides of the base 20a.

As shown in FIG. 3D, the user can insert the protruding structure 241 of the pressing plate into the corresponding recess 206. During the insertion process, the inclined surface 243 of the end structure 242 an end surface of the lateral plate 220 of the retaining structure 22a would abut against each other. The surface of the end structure 242 is the inclined surface 243 that is wider as the position is closer to the pressing plate 240. As the protruding structure 241 is inserted into the recess 206, the inclined surface 243 would press the end surface of the corresponding lateral plate 220 to make the second holding structure 221a deformed upwardly, so that the second engaging structure 221a is separated from the first engaging structure 204a, and the retaining structure 22a moves upwardly to a height H from the top surface 209 of the base 20a.

Figure 4A:
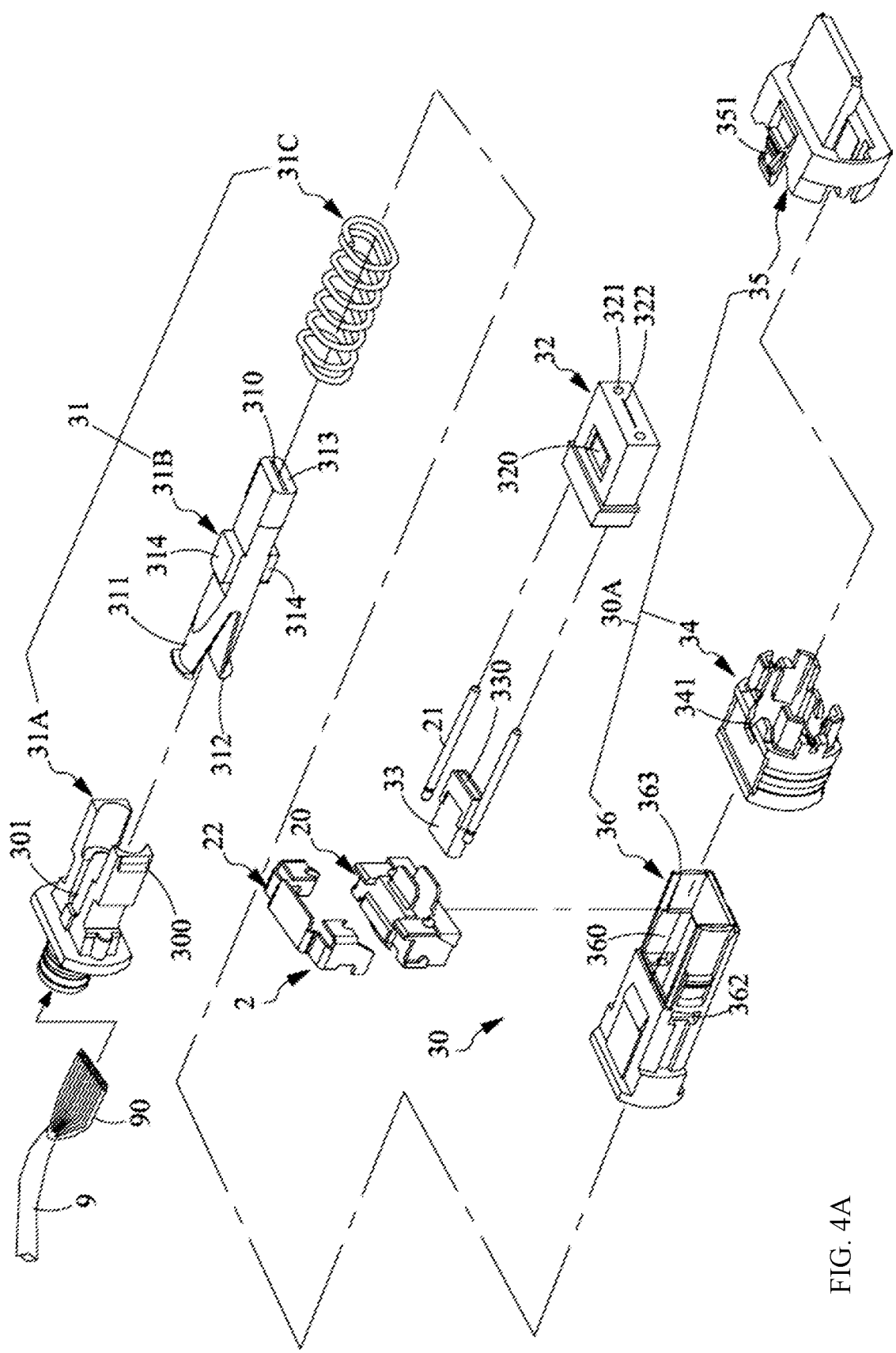
FIG. 4A is a three dimensional exploded diagram of an embodiment of an optical connector in the present invention.
Figure 4B:
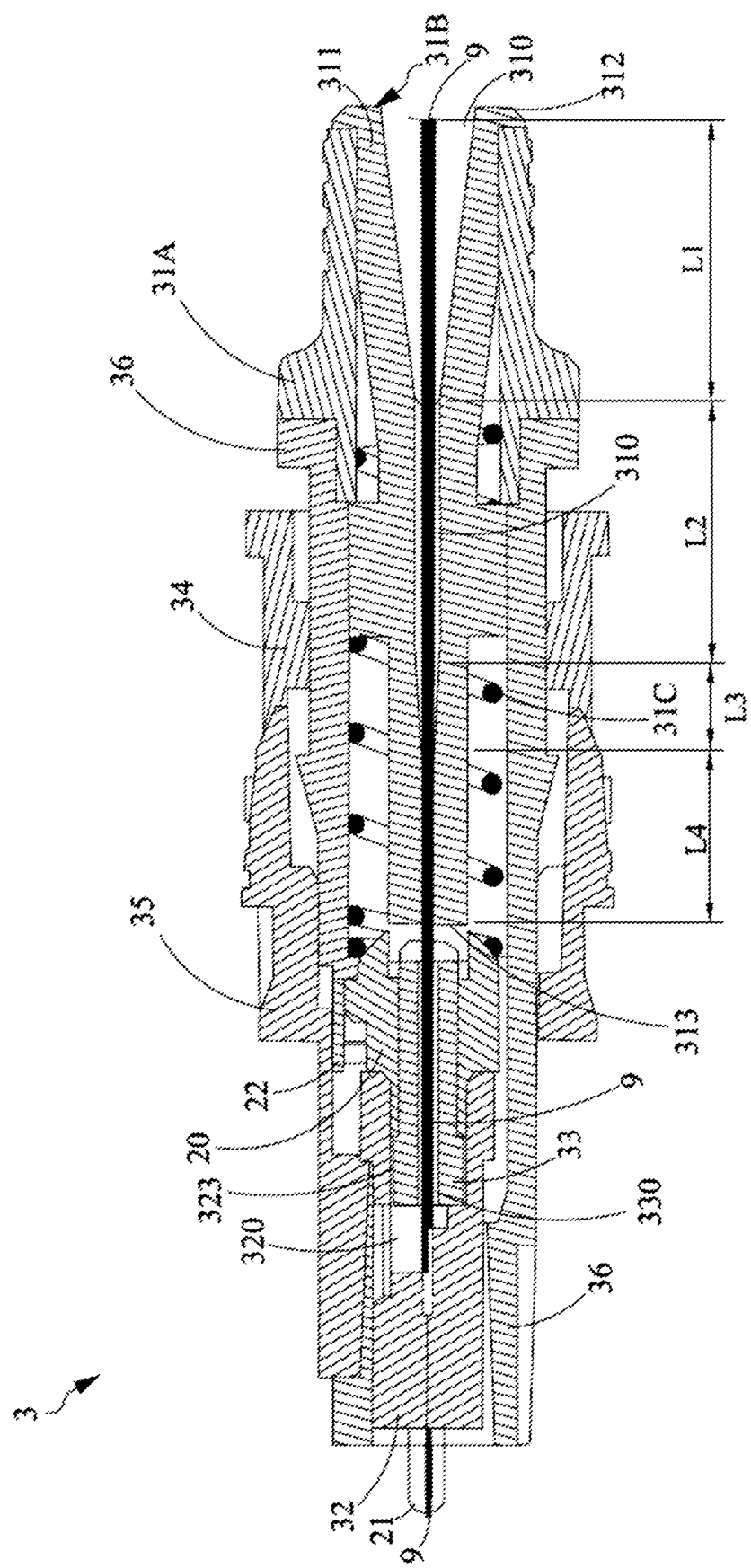
FIG. 4B is a schematic cross-sectional diagram of the optical connector.
Figure 4C:
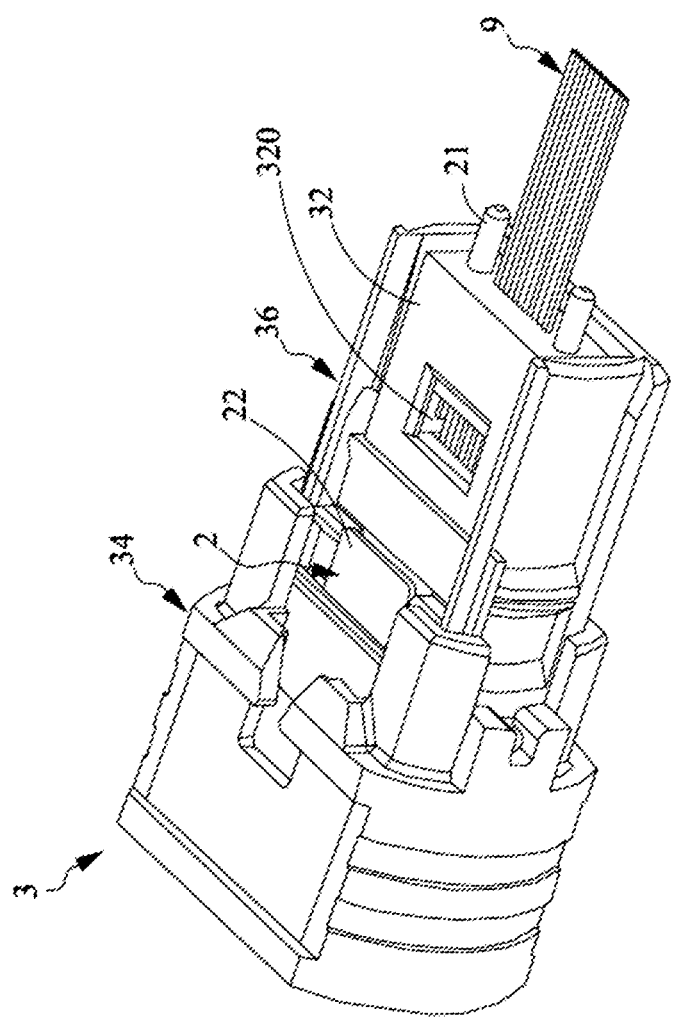
FIG. 4C is a schematic diagram showing an embodiment of the optical connector with an open window when the cover is removed.
Figure 4D:
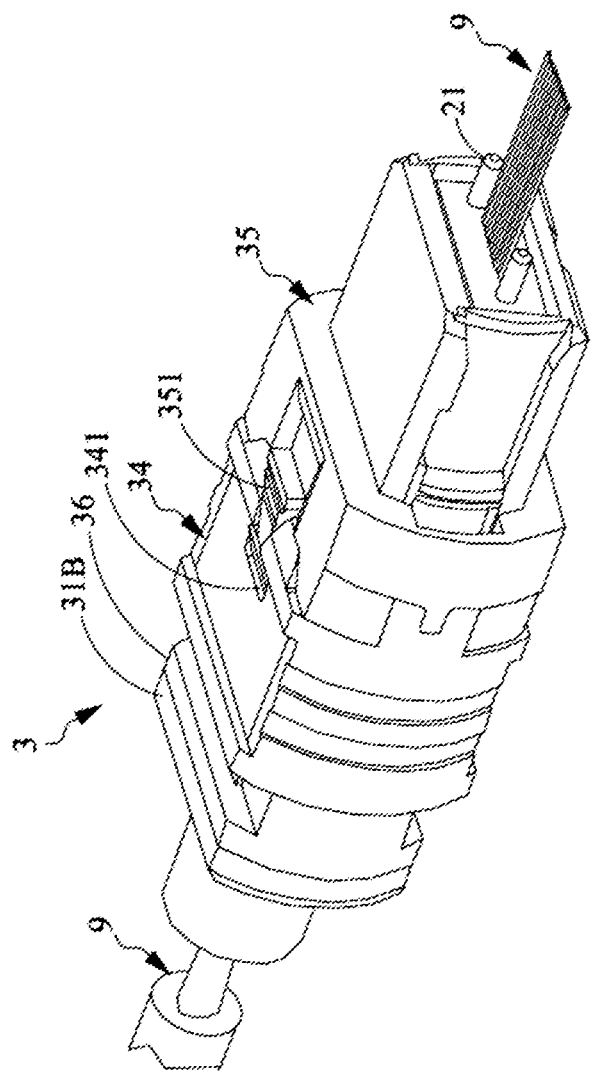
FIG. 4D is a three dimensional schematic diagram of the optical connector formed by various components shown in FIG. 4A.

Please refer to FIGS. 4A to 4D, in which FIG. 4A is a three dimensional exploded schematic diagram of an embodiment of an optical connector in the present invention; FIG. 4B is a schematic cross-sectional diagram of the optical connector; FIG. 4C is the optical connector with an open window when the cover is removed; and FIG. 4D is a three dimensional schematic diagram of an optical connector formed by combining the various components shown in FIG. 4A. The optical connector in this embodiment is only an embodiment of the guide pin retainer in the present invention. Therefore, the categories of optical connectors are not limited to those shown in the figure. The optical connector 3 has a first clamping assembly 30 for clamping the communication wire 9, the first clamping assembly 30 has a first clamping seat 33 for clamping the communication wire 9, and a housing module 30A. The first clamping seat 33 has a first guiding groove 330, which allows the communication wire 9 to pass through. The housing module 30A is used to cover the first clamping seat 33.

In this embodiment, the first clamping assembly 30 has a connecting head 32 coupled to the first clamping seat 33. The connecting head 32 has an observation window 320, a through hole 321 and a wire channel 322. The through hole 321 allows the guide pin 21 to penetrate through the connecting head 32. In this embodiment, the through hole 321 of the connecting head 32 has an insertion hole on one side corresponding to the first clamping seat 33, and the first clamping seat 33 is inserted into the insertion hole, so that the connecting head 32 and the first clamping seat 33 are combined. In this embodiment, the housing module 30A has an accommodating seat 36, a sleeve 34 and a housing retainer 35. The accommodating seat 36 accommodates the guide pin retainer 2. The sleeve 34 is sleeved on the periphery of the accommodating seat 36, and the housing retainer 35 is sleeved on the periphery of the accommodating seat 36 and is coupled to the sleeve 34.

The optical connector 3 has a second clamping assembly 31 coupled to the first clamping assembly 30. The second clamping assembly 31 has a second clamping seat 31B, which has a second guiding groove 310 corresponding to the first guiding groove 330 and allows the communication wire 9 to pass through. The second clamping assembly 31 has a tailstock 31A and an elastic element 31C. The tailstock 31A is used to allow the communication wire 9 to pass through, and the second clamping seat 31B is accommodated in the tailstock 31A. In this embodiment, the communication wire 9 is penetrated into the second guiding groove 310 by penetrating through the first end 312 of the second guiding groove 310 of the entire second clamping seat 31B, and then passes through the second guiding groove 310 from the second end 313. There are fixing blocks 314 at positions corresponding to the outer surfaces of the two sides of the second clamping seat 31B. When the fixing blocks 314 included in the second clamping seat 31B is used for mounting on the tailstock 31A, the fixing blocks 314 are embedded into the opening 301 on the tailstock 31A to generate a fixing effect.

In this embodiment, the second clamping seat 31B has an elastic fixing seat 311 on the first end 312, and the elastic fixing seat 311 is a Y-shaped structure. When the second clamping seat 31B is installed in the tailstock 31A, the tailstock 31A and the wall surface of the elastic fixing seat 311 have a force on the elastic fixing seat 311, so that the elastic fixing seat 311 is deformed, and a force is also applied on the wall surface of the tailstock 31A. The second clamping seat 31B can be fixed in the tailstock 31A. In this embodiment, the second guiding groove 310 has a second end 313 corresponding to the through slot 200, and the opening at the first end 312 is gradually reduced from the first end 312 to the second end 313. The second guiding groove 310 has a first end 312 that is tapered by a first distance L1, the first diameter is maintained to extend along a second distance L2 and is tapered by a third distance L3, and the second diameter is maintained to extend along a fourth distance L4. The tapered design of the through slot 200 will help the installation of communication wires.

The elastic element 31C is sleeved on the periphery of the second clamping seat 31B and is accommodated in the tailstock 31A. Since there are fourth engaging structures 300 on both sides of the tailstock 31A, which is a bump structure in this embodiment, and there are fifth engaging structures 362 on both sides of the accommodating seat 36, and the fifth engaging structures 362 is an opening structure in this embodiment. When the tailstock 31A is inserted into the accommodating seat 36 to a certain depth, the fourth engaging structure 300 and the fifth engaging structure 362 corresponds to and combine with each other, so that the fourth engaging structure 300 is embedded into the fifth engaging structure 362 to achieve fixation effect. In this embodiment, the guide pin retainer 2 is the structure shown in FIGS. 2A and 2B. The guide pin 21 disposed in the guide pin retainer 2 penetrates into the through hole 321 of the connecting head 32, so that the connecting head 32 is combined with the first clamping seat 33 disposed inside of the guide pin retainer 2. The guide pin retainer 2 and the connecting head 32 are accommodated in the accommodating space 360 of the accommodating seat 36.

Figure 5:
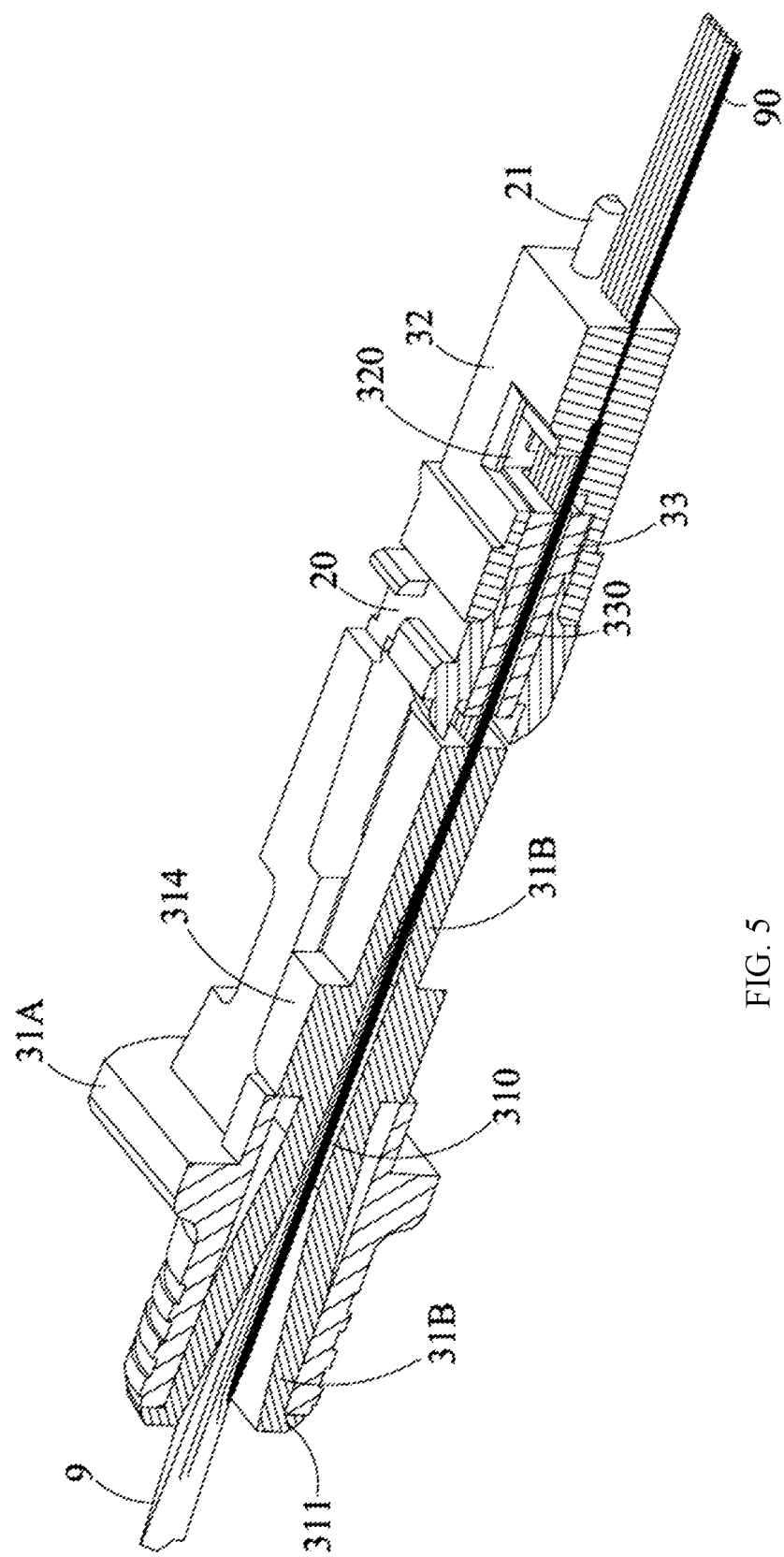
FIG. 5 is a schematic diagram of threaded communication wire in the present invention.

Please refer to FIG. 5, which is a schematic diagram of the threaded communication wire in the present invention. The second clamping seat 31B of the present invention is pre-assembled to the tailstock 31A, and the connecting head 32 may more easily let the communication wire 9 pass into the optical connector 3 and then pass the connecting head 32 out. In this embodiment, the communication wire 9 is inserted from the first end 312 of the second clamping seat 31B, passes through the second guiding groove 310, then passes through the first guiding groove 330, and then passes through the observation window 320 until the end exit of the wire channel 322. The second clamping seat 31B may not affect the operation of the elastic element 31C. The user is able to observe the insertion process of each sub-wire 90 in the observation window 320. If there is a problem, because the observation window 320 is open, the sub-wire 90 may also be moved to allow the sub-wire 90 to enter the wire channel 322 and pass through the connecting head 32. There is a second clamping seat 31B, which helps to insert the communication wire 9.

After the threading process of communication wire 9 is completed, the sleeve 34 is inserted from the front end 363 of the accommodating seat 36 to form a state as shown in FIG. 4C. Finally, the housing retainer 35 is inserted into the front end 363 of the accommodating seat 36 and combined with the sleeve 34 to form a state as shown in FIG. 4D, and the assembly of the optical connector is completed. In this embodiment, the sleeve 34 has a first coupling structure 341 near the housing retainer 35, and the housing retainer 35 has a second coupling structure 351 combined with the first coupling structure 341. The first coupling structure 341 is an opening structure, and the second coupling structure 351 is a cantilevered bump structure, which can be engaged with the first coupling structure 341. When a force is applied to the second coupling structure 351 from a predetermined direction (in this embodiment, a downward force is applied to the second coupling structure 351), so that the second coupling structure 351 is forced to move downward and is separated from the first coupling structure 341. As a result, the coupling state of the sleeve 34 and the housing retainer 35 is released.

Figure 6A:
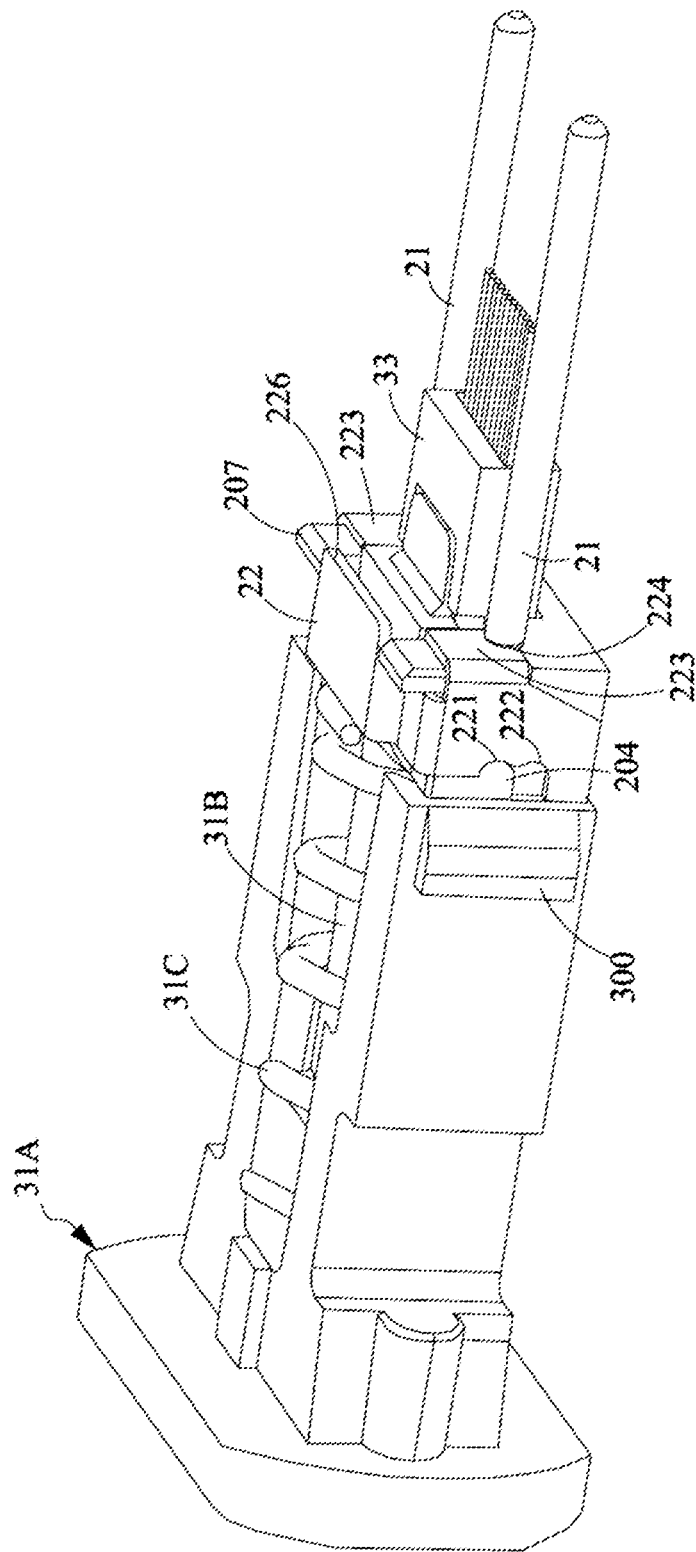
FIGS. 6A and 6B are schematic diagrams of operating the retaining structure in the optical connector.
Figure 6B:
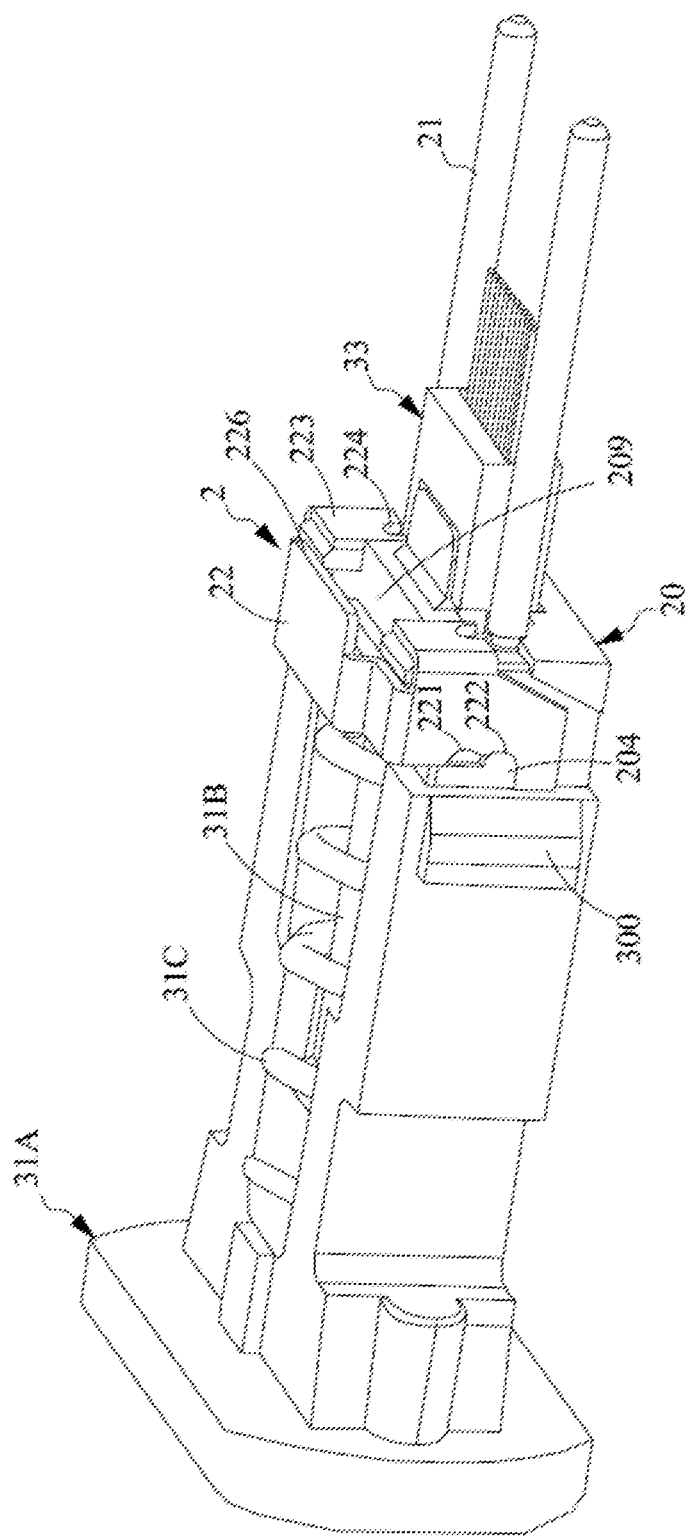

Next, the issue is how to remove the guide pin 21 of the optical connector 3. In this embodiment, the guide pin retainer 2 shown in FIG. 2A is used. In an embodiment for disassembling, the optical connector 3 is opened to the state shown in FIG. 4C, that is, the housing retainer 35 is disassembled. As shown in FIGS. 6A and 6B, for convenience of description, in which only components used by the optical connector are shown. When the housing retainer 35 is removed, the retaining structure 22 is located at the first position, the state where the first engaging structure 204 and the second engaging structure 221 are combined. The user may use a jig, such as a wrench or a plug, to insert into the space between the extending plate 226 and the top surface 209, to move the retaining structure 22 upwardly, and the retaining structure 22 is moved upwardly by the force to release the combination state of the first engaging structure 204 and the second engaging structure 221. After the retaining structure 22 moves upwardly, the third engaging structure 222 is combined with the first engaging structure 204, so that the retaining structure 22 is positioned at the second position, and the restraint of the retaining structure 22 on the guide pin 21 is released to form the state shown in FIG. 6B. It should be noted that the upward movement of the retaining structure 22 is not limited to this embodiment. For example, when the guide pin retainer 2a shown in FIG. 3A is installed in the optical connector, the retaining structure 22a can be moved upwardly by inserting the jig 24. Therefore, how to move the retaining structure 22 upwardly, for example, move upwardly from the open position, or insert a tool into the left slot or right slot of the optical connector to move upwardly, may be implemented without limitation in the present invention.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. A guide pin retainer, comprising:
   a base, having a through slot, a through hole disposed on a surface of an opening of the through slot and both sides of the opening for accommodating a guide pin, a first engaging structure formed on two lateral surfaces of the base; and
   a retaining structure, disposed on the base, the retaining structure having a pair of parallel lateral plates slidably coupled to the two lateral surfaces of the base respectively, the each lateral plate having a second engaging structure, a positioning plate extended from the each lateral plate and abutted against the surface of the opening, the positioning plate having a first holding structure,
   wherein when the retaining structure is located at a first position, the second engaging structure and the first engaging structure are combined with each other, the first holding structure is used for constraining the guide pin; and when the retaining structure is located at a second position, the second engaging structure is separated from the first engaging structure, the first holding structure is separated from the guide pin.

2. The guide pin retainer of claim 1, wherein the retaining structure comprises a third engaging structure, which is combined with the first engaging structure when the retaining structure is located at the second position.

3. The guide pin retainer of claim 1, wherein the base includes two convex walls corresponding to the positioning plates, the two convex walls being separated by a predetermined distance.

4. The guide pin retainer of claim 3, wherein the retaining structure has a connecting plate connected to the pair of lateral plates respectively, an extending plate is protruded from the connecting plate and located between the two convex walls when the retaining structure is at the first position.

5. The guide pin retainer of claim 1, wherein the base and a wall includes a recess corresponding to the lateral plate, when a tool is inserted into the recess, a force is generated on an end of the lateral plate to make the second engaging structure separated from the first engaging structure.

6. An optical connector, comprising:
   a first clamping assembly, for clamping a communication wire, the first clamping assembly having a first clamping seat for clamping the communication wire, the first clamping seat having a first guiding groove, which allows the communication wire to pass through, and the first clamping assembly having a housing module for covering the first clamping seat;
   a guide pin retainer, having a base and a retaining structure, the base having a through slot, the first clamping seat passing through the through slot, a through hole disposed on a surface of an opening of the through slot and both sides of the opening for accommodating a guide pin, a first engaging structure formed on two lateral surfaces of the base, and the retaining structure disposed on the base and having a pair of parallel lateral plates slidably coupled to the two lateral surfaces of the base respectively, the each lateral plate having a second engaging structure, a positioning plate extended from the each lateral plate and abutted against the surface of the opening, the positioning plate having a first holding structure, the retaining structure located at a first position, the second engaging structure and the first engaging structure combined with each other, the first holding structure used for constraining the guide pin; and a second clamping assembly, coupled to the first clamping assembly, the second clamping assembly having a second clamping seat, the second clamping seat having a second guiding groove corresponding to the first guiding groove, wherein when the housing module is disassembled to separate with the guide pin retainer and the retaining structure is located at a second position, the second engaging structure is separated from the first engaging structure, the first holding structure is separated from the guide pin.

7. The optical connector of claim 6, wherein the retaining structure comprises a third engaging structure, which is combined with the first engaging structure when the retaining structure is located at the second position.

8. The optical connector of claim 6, wherein the housing module has an accommodating seat, a sleeve, and a housing retainer, the accommodating seat accommodates the guide pin retainer, the sleeve is sleeved on a periphery of the accommodating seat, and the housing retainer is sleeved on the periphery of the accommodating seat and coupled to the sleeve.

9. The optical connector of claim 8, wherein the sleeve has a first coupling structure near the housing retainer, and the housing retainer has a second coupling structure combined with the first coupling structure, when a force is applied to the second coupling structure in a predetermined direction, the second coupling structure is separated from the first coupling structure.

10. The optical connector of claim 8, wherein the first clamping assembly has a connecting head disposed into the accommodating seat, and couples to the guide pin retainer.

11. The optical connector of claim 6, wherein the second clamping assembly has a tailstock to cover the second clamping seat, an elastic element is disposed between the second clamping seat and the tailstock, and an end of the elastic element is abutted against the base, another end of elastic element is abutted against the tailstock.

12. The optical connector of claim 6, wherein an opening of a first end of the second guiding groove allows the communication wire to pass through, the second guiding groove has a second end corresponding to the through slot, an opening of the first end is gradually reduced from the first end to the second end.

13. The optical connector of claim 12, wherein after the first end of the second guiding groove is tapered by a first distance, a first diameter is maintained to extend along a second distance and is tapered by a third distance, and a second diameter is maintained to extend along a fourth distance.

14. The optical connector of claim 6, wherein the base includes two convex walls corresponding to the positioning plates, the two convex walls being separated by a predetermined distance.

15. The optical connector of claim 14, wherein the retaining structure has a connecting plate connected to the pair of lateral plates respectively, an extending plate is protruded from the connecting plate and located between the two convex walls when the retaining structure is at the first position.

16. The optical connector of claim 6, wherein the base includes a recess corresponding to the lateral plate, when a tool is inserted into the recess, a force is generated on an end of the lateral plate to make the second engaging structure separated from the first engaging structure.

* * * * *